United States Patent [19]

Isobe et al.

[11] Patent Number: 5,064,112
[45] Date of Patent: Nov. 12, 1991

[54] JOINTING TI-A1 ALLOY MEMBER AND STRUCTURAL STEEL MEMBER

[75] Inventors: Susumu Isobe; Toshiharu Noda, both of Nagoya; Hiroshi Hirayama, Hadano, all of Japan

[73] Assignees: Fuji Valve Co., Tokyo; Daido Tokushuko Kabushiki Kaisha, Nagoya, both of Japan

[21] Appl. No.: 433,253

[22] Filed: Nov. 8, 1989

[30] Foreign Application Priority Data

Nov. 11, 1988 [JP] Japan ............................. 63-285279

[51] Int. Cl.$^5$ ............................................. B23K 20/12
[52] U.S. Cl. ...................................... 228/112; 228/175
[58] Field of Search .............................. 228/112–114, 228/175; 420/420

[56] References Cited

U.S. PATENT DOCUMENTS

| | | | |
|---|---|---|---|
| 4,073,474 | 2/1978 | Hashimoto et al. | 228/112 |
| 4,333,671 | 6/1982 | Holko | 228/175 X |
| 4,832,769 | 5/1989 | Shantz et al. | 228/112 |
| 4,834,036 | 5/1989 | Nishiyama et al. | 420/418 |
| 4,849,168 | 7/1989 | Nishiyama et al. | 420/418 |
| 4,964,564 | 10/1990 | Neal et al. | 228/107 |

*Primary Examiner*—Kenneth J. Ramsey
*Attorney, Agent, or Firm*—Varndell Legal Group

[57] ABSTRACT

Disclosed is a method of jointing a member of Ti-Al alloy which mainly consists of an intermetallic compound, TiAl, and a member of structural steel. The jointing uses an intermediate member made of an austenitic stainless steel or a heat resistant steel, or a Ni-based or Co-based superalloy, between the above two members, and the jointing of the intermediate member and the structural steel member at least is carried out by friction welding. A typical example of the jointed machine part manufactured by this method is an engine valve.

11 Claims, 3 Drawing Sheets

JOINTING Ti-Al ALLOY MEMBER AND STRUCTURAL STEEL MEMBER

BACKGROUND OF THE INVENTION

1. Field of the Invention

The present invention concerns a method of jointing a member made of Ti-Al alloy which mainly consisting of the intermetallic compound, TiAl, and a member made of a structural steel to produce one machine structural part. The invention also concerns the jointed machine parts produced by this method.

2. State of the Art

As the material for a machine part which moves rotationally or reciprocally at a high steed, such as turbin blades and engine valves or wheels of turbochargers, the use Ti-Al alloys, particularly those containing 32-38% of Al, with or without modifying elements. These alloys are heat resistant (durable at a temperature of 700° C. or higher) and light weight (specific gravity 3.8) will become more popular.

The inventors have made research with coworkers on the materials for the above have developed and disclosed some Ti-Al alloys. These include the alloy which consists essentially of 32-38% of Al and the balance of Ti; the alloy which consists essentially of 32-38% of Al, 0.005-0.20% of B, and the balance of Ti and the alloy which essentially consists of the above quantity of Al and contains, in addition to the above quantity of B, up to 0.2% of C, up to 0.3% of 0 and/or up to 0.3% of N, provided that O+N up to 0.4% and the balance of Ti (Japanese Patent Disclosure Sho 63-125634). These alloys have improved strength and toughness when compared with the conventional Ti-Al alloys.

Further examples of improved alloys are the alloy which consists essentially of 32-38% of Al, 0.05-3.0% of Ni and/or 0.05-3.0% of Si and the balance of Ti and the alloy according to this composition further containing the above quantity of B or controlled amount of C, O and N (Japanese Patent Disclosure Sho 62-236609). These alloys are of higher ductility and easy to cast.

In order to make it possible to use the Ti-Al alloy member under the conditions of a high temperature and high speed movement such as rotation, it is occasionally necessary to joint the member to a member of structural steel which can be surface hardened. The term "structural steel" means the steels which can be used as the material for the structural member of machine parts. For example, in a hot wheel of a turbocharger, SCM-steel or SNCM-steel is used for the axis of rotation, and in an engine valve, martensitic heat resistant steel is used for the stem. All the steels of this kind are included in the structural steels.

As a method for jointing the Ti-Al alloy member and the structural steel member, shrink fitting has been tried, but, silver alloy brazing is usually used. However, due to the fact that the temperature of the exhaust gas from the engines has become higher due to the increased output of the engines, brazing is becoming less reliable because the strength of brazed parts is not sufficient.

On the other hand, Ni-based superalloy also used as has been a material for the hot wheels, and friction welding has been used for jointing such a wheel to the axis made of structural steel. The friction welding provides a higher strength to the jointed part (in comparison with the welding method using a filler metal), which is 95% or higher of the strength of the base metal, and therefore, it is a preferable welding method for manufacturing this kind of machine part.

Even if the friction welding is tried to joint the hot wheel made of a Ti-Al alloy and the axis made of a structural steel such as SCM 435, the jointing is not successful because cracks occur after the welding is done. This is due to breakage of the jointed part because of martensitic transformation occured in the material of the axis during cooling after the welding at a high temperature generated by the friction resulting in expansion of volume, and because of the formation of brittle substances such as TiC at the jointed region.

SUMMARY OF THE INVENTION

The object of the present invention is to enable manufacturing of desired machine parts by jointing the Ti-Al alloy member and the structural steel member such as axis to give a joint which is durable at a higher temperature, and thus, to solve the above-noted problems.

The method of jointing Ti-Al alloy member and the structural steel member according to the present invention is characterized in that a member made of an austenitic stainless steel or a heat resistant steel, or a Ni-based or Co-based superalloy is used as the intermediate member between the above members, and that the jointing of the intermediate member and the structural steel member at least is carried out by friction welding.

BRIEF DESCRIPTION OF THE DRAWINGS

FIG. 1 and FIG. 2 show a hot wheel of a turbocharger, and FIG. 3 shows an engine valve; all the figures being side view in which halves are cross sectional.

DETAILED EXPLANATION OF THE PREFERRED EMBODIMENTS

In the case where an austenitic stainless steel or a heat resistant steel is used as the intermediate member, it is available to permit the jointing between the intermediate member and the Ti-Al alloy member by friction welding.

If it is desired to realize an extremely good high temperature strength at the jointed part, a γ-precipitation-hardened Ni-based superalloy can be used as the material of the intermediate member. The friction welding is a useful way of jointing also in this case, but it is possible to joint, instead of the friction welding, by means of internal chilling or insert-casting to partly envelope the Ni-based intermediate member with the Ti-Al alloy member. This is because both this kind of Ni-based superalloy and the Ti-Al alloy have the similar thermal expansion coefficients.

The jointed machine part according to the present invention of the Ti-Al alloy member and the structural steel member is a jointed machine part made by jointing a member of Ti-Al alloy mainly consisting of the intermetallic compound, TiAl, and the member of the structural steel, and is characterized in that an intermediate member which is made of an austenitic stainless steel or a heat resistant steel, or a Ni-based or Co-based superalloy is interposed therebetween, and that at least the intermediate member and the structural steel member are jointed by friction welding.

The present invention can be applied to all the Ti-Al alloys mentioned above, but, in view of the use of the machine parts which are used under a high temperature and high speed rotational or reciprocal movement, it is advisable to use, even if the alloy composition shifts from the intermetallic compound, TiAl (Al:36%-Ti:64%), a composition of Ti-rich side, and the composition in the Al-rich side is not so useful.

Accordingly, typical Ti-Al alloys to which the present invention is to be applied are those having the following compositions:

1) a Ti-Al alloy containing of 32–36% Al and the balance substantially of Ti,
2) a Ti-Al alloy containing 32–36% of Al, at least one member selected from the groups below:
   a) 0.005–0.20% of B,
   b) up to 0.2% of C and up to 0.3% of O and/or up to 0.3% of N (provided that O+N is not higher than 0.4%), and
   c) 0.05–3.0% of Ni and/or 0.05–3.0% of Si, and the balance of Ti.

Figure 1:
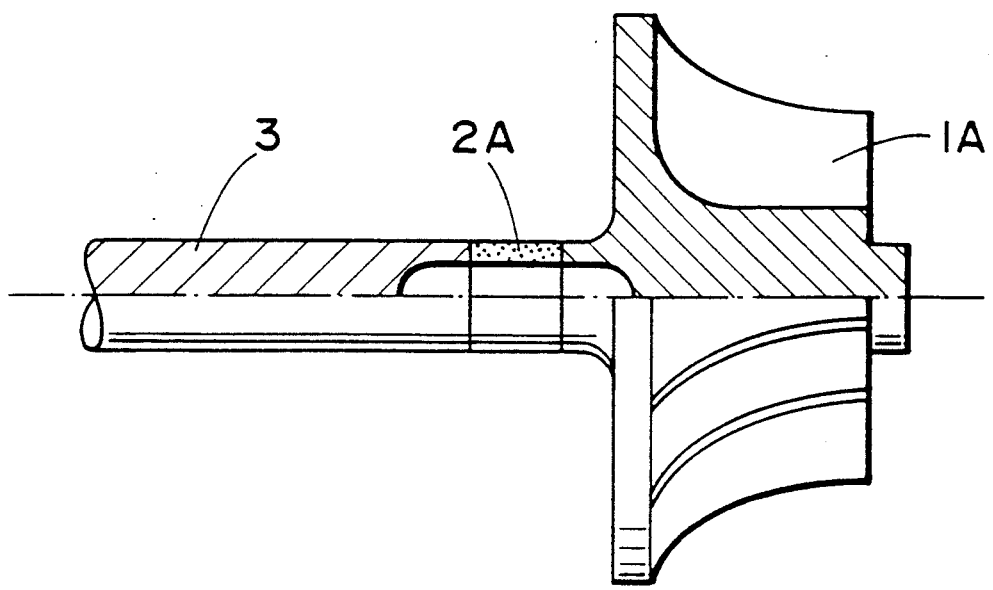
FIG. 1, FIG. 2 and FIG. 3 are the figures illustrating an example of a machine part manufactured by the present method of jointing.

An example of the machine part, which is a hot wheel of a turbocharger is shown in FIG. 1. The hot wheel consists of a wheel 1A of the Ti-Al alloy, a ring of INCONEL 751 as the intermediate member 2A and a rod of SCM 435 steel as the axle 3, and is manufactured by jointing all the members by friction welding.

Figure 2:
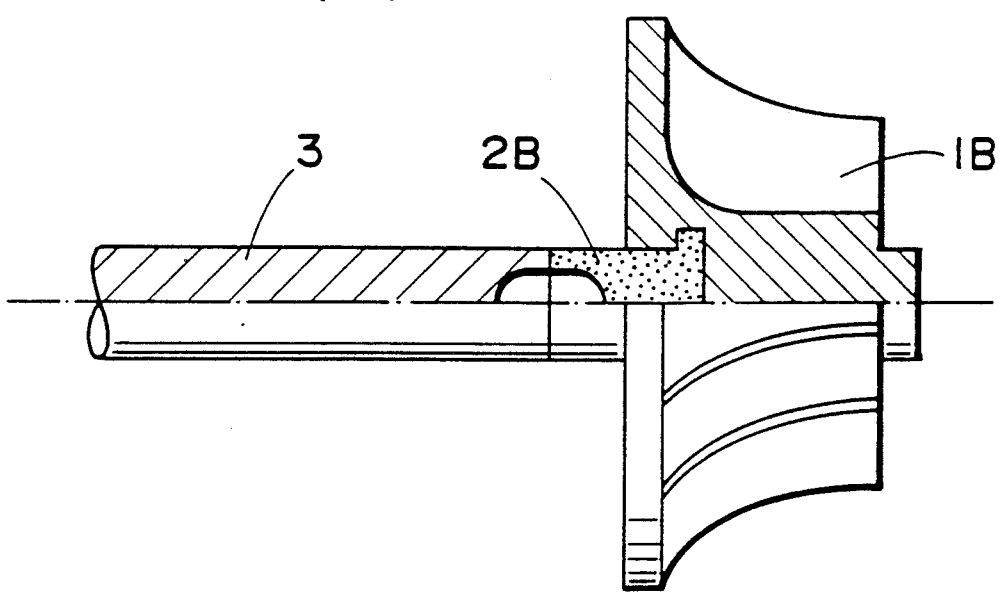

FIG. 2 shows a similar machine part, which is manufactured by incorporating a nut-shaped Ni-based super alloy member 2B as the intermediate member with the material of the wheel 1B when casting the latter, and jointing the thus made intermediate member and the rod of axle 3 by friction welding.

Figure 3:
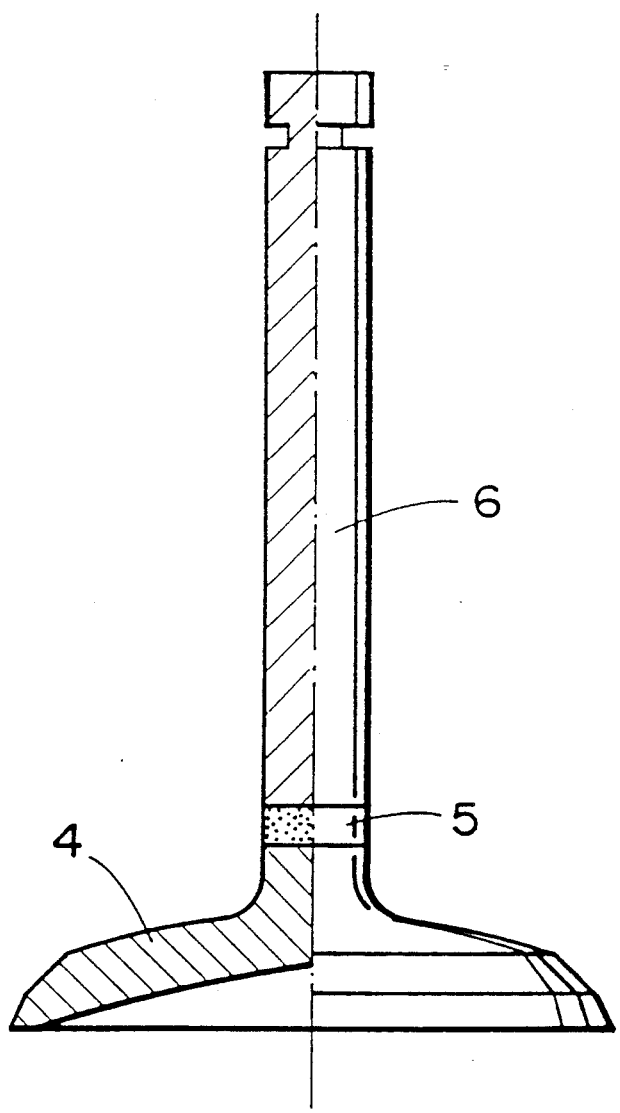

The machine part shown in FIG. 3 is an engine valve, which is manufactured by jointing all the members, a valve body 4 of the Ti-Al alloy, a disk 5 of INCONEL 751 as the intermediate member, and a stem 6 of SUH3 steel, by friction welding. In order to finish the above prepared blank to the valve, it is of course necessary to treat the stem by toughtride (soft nitriding) treatment so as to surface-harden, and apply build up welding of a hard metal such as Stelite to the part which contacts the valve seat.

According to the present method of jointing, it is possible to joint the Ti-Al alloy member which is light weight and has good heat resistance to the structural steel member which is surface hardenable and has high strength, and to give high strength to the jointed part.

The improved high temperature strength of the jointed part enables application of high frequency hardening or flame hardening for surface hardening to the journal part or the seal ring groove neighboring to the jointed part.

Because the heat resistant alloys used in the present invention as the intermediate member generally have lower thermal conductivities, even if the Ti-Al alloy member is subjected to a high temperature, heat transfer from the member to the axle member is relatively small. This contributes to increase of durability of the machine part such as the journal.

Thus, the present invention is particularly useful when applied to manufacturing of the machine parts such as hot wheels of turbochargers, engine valves, turbine blades and disks.

EXAMPLE

The following three materials all in the form of a rod of diameter 8.5 mm were friction welded with a break-type welding machine to form a single rod. Welding was carried out firstly at the end faces of "A" and "B", and A) Ti-Al alloy (Al 36%, Hv 250)
B) INCONEL 751 (HRC 39) intermediate member
C) SNCM 439 steel (HRC 33) axis member Flashes occured at the welded parts were removed by cutting with a lath.

Figure 4:
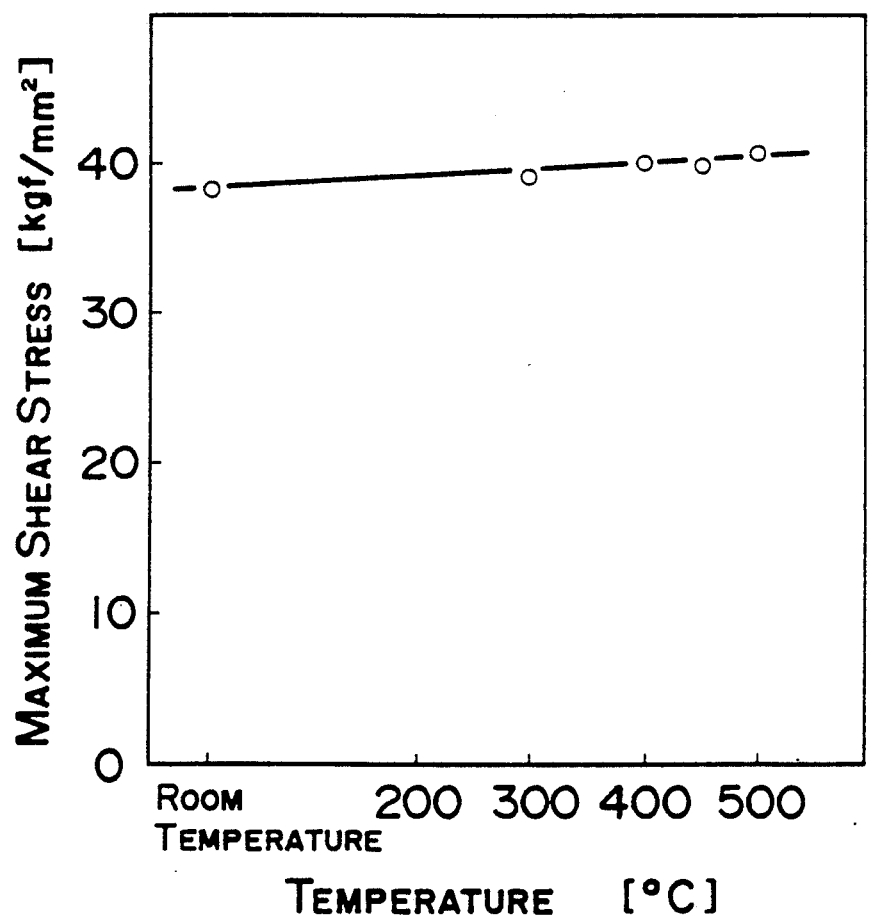
FIG. 4 is a graph showing the results of hot torsion test of the jointed parts obtained by the present method.

Hot torsion tests on the jointed parts proved that the strength is sufficient as shown in FIG. 4. Breakage occurred in the Ti-Al alloy member, one of the base metals.

We claim:

1. A method of jointing a member of Ti-Al which mainly consists of an intermetallic compound, TiAl, and a member of a structural steel, comprising jointing said two members with an intermediate member made of an austenitic stainless steel or a heat resistant steel, or a Ni-based or Co-based superalloy therebetween, the jointing of the intermediate member and the structural steel member being carried out at least by friction welding.

2. A method of jointing members according to claim 1, wherein the intermediate member is made of an austenitic stainless steel or a heat resistant steel, and the jointing of this member and the Ti-Al alloy member is also carried out by friction welding.

3. A method of jointing members according to claim 1, wherein the intermediate member is made of Ni-based alloy of γ'-precipitation hardened type, and the jointing of the intermediate member and the Ti-Al alloy member is carried out by insert-casting the intermediate member in the Ti-Al alloy member.

4. A jointed machine part comprising a member of Ti-Al alloy member which mainly consists of an intermetallic compound, TiAl, a member of structural steel member and an intermediate member therebetween, the intermediate member being made of an austenitic stainless steel or a heat resistant steel, or a Ni-based or Co-based super alloy, and the intermediate member and the structural steel member being jointed by friction welding.

5. A jointed machine part according to claim 4, wherein the Ti-Al alloy member used consists essentially of 32–36% of Al and the balance of Ti.

6. A jointed machine part according to claim 4, wherein the Ti-Al alloy member used consists essentially of 32–36% of Al, at least one member selected from the following groups:
   a) 0.005–0.20% of B
   b) up to 0.2% of C, and up to 0.03% of O and/or up to 0.3% of N (provided that O+N is up to 0.4%)
   c) 0.05 and 3.0% of Ni and/or 0.05–3.0% or Si, the balance of Ti.

7. A jointed machine part according to claim 4, which is an engine valve using a martensitic heat resistant steel member as the structural steel member and a Ni-based super alloy member as the intermediate member.

8. The jointed member according to claim 3, wherein the intermediate member is insert-casted with the Ti-Al alloy member so as to have a flange portion disposed in the Ti-Al alloy member.

9. The jointed machine part according to claim 4, wherein the Ti-Al alloy member is jointed to the intermediate member by a portion of the intermediate member insert-casted with the Ti-Al alloy member.

10. A jointed machine part according to claim 4, wherein the Ti-Al alloy member and the intermediate member are joined by friction welding.

11. A jointed machine part according to claim 4, wherein the Ti-Al member has a flange disposed within the Ti-Al alloy member.

* * * * *